United States Patent [19]

Elsmore

[11] Patent Number: 5,416,411
[45] Date of Patent: May 16, 1995

[54] SYSTEM AND METHOD FOR MEASURING THE THICKNESS OF A FERROMAGNETIC LAYER

[75] Inventor: Dirk A. Elsmore, Fort Worth, Tex.

[73] Assignee: Lockheed Fort Worth Company, Fort Worth, Tex.

[21] Appl. No.: 2,173

[22] Filed: Jan. 8, 1993

[51] Int. Cl.[6] .......................... G01B 7/10; G01R 35/00
[52] U.S. Cl. ................................... 324/230; 324/202; 324/227; 364/571.07
[58] Field of Search ............... 324/228, 229, 230, 231, 324/202, 227; 73/1 J, 1 R; 364/571.01-571.08, 573

[56] References Cited

U.S. PATENT DOCUMENTS

| | | | |
|---|---|---|---|
| 4,715,007 | 12/1987 | Fujita et al. | 324/230 |
| 4,771,237 | 9/1988 | Daley | 324/202 |
| 4,942,545 | 7/1990 | Sapia | 73/1 J |
| 4,950,990 | 8/1990 | Moulder et al. | 324/202 |
| 5,017,869 | 5/1991 | Oliver | 324/230 |

FOREIGN PATENT DOCUMENTS

| | | | |
|---|---|---|---|
| 2461805 | 8/1976 | Germany | 324/230 |
| 0171403 | 9/1985 | Japan | 324/229 |
| 1437679 | 11/1988 | U.S.S.R. | 324/229 |

OTHER PUBLICATIONS

Pub., Paul Dick, Measurement of Thickness of Coatings, Feb. 1961, pp.48-50, Electronics.

Pub., M. A. Rusher, Enamel Thickness Gauge, Nov. 1935, pp. 365-367.

Primary Examiner—Sandra L. O'Shea
Assistant Examiner—Jay M. Patidar
Attorney, Agent, or Firm—Felsman, Bradley, Gunter & Dillon

[57] ABSTRACT

A system is provided for measuring the thickness of a ferromagnetic layer formed over a conductive base layer. An eddy current probe is provided for measuring the thickness of the ferromagnetic layer. The eddy current probe can be placed in direct contact with the ferromagnetic layer, or it may be spaced above its surface by an unknown standoff distance. This spacing may be caused by the presence of an overlying nonferrous, nonconductive layer applied over the ferromagnetic layer, or it may be an air gap over the ferromagnetic layer. An analog detector connected to the probe provides output values in two dimensions corresponding to the modulation of the probe's magnetic field by the ferromagnetic and conductive layers. These values are utilized to determine a mapping between the detector output values and ferromagnetic layer thickness and standoff values. The output of the mapping function provides two values, a ferromagnetic layer thickness and a standoff distance, which corresponds to the detected values. The mapping function is calibrated by measuring several test objects having known ferromagnetic layer thicknesses and standoff values. Interpolation techniques are used to generate data points for the mapping function between those measured for the test objects. The mapping function can be efficiently performed using a lookup table.

20 Claims, 4 Drawing Sheets

SYSTEM AND METHOD FOR MEASURING THE THICKNESS OF A FERROMAGNETIC LAYER

BACKGROUND OF THE INVENTION

1. Field of the Invention

The present invention relates generally to electronic measuring devices, and more specifically to a system for measuring layer thicknesses using a magnetic probe.

2. Description of the Prior Art

Fabrication of various types of material layers is done in many applications. In some of these applications, it is important to be able to accurately measure the thicknesses of the layers of material which have been applied. In one such application, a layer of a ferromagnetic, virtually nonconductive, material is applied over a relatively thick conductive base layer. A nonferrous, nonconductive top layer, such as paint, may be applied over the ferromagnetic layer. Both the ferromagnetic layer and the top layer may have uneven thicknesses, and it is desirable to be able to measure both of these thicknesses.

Several techniques have previously been developed to measure the thickness of nonconductive layers over ferromagnetic base layers. Measurement of ferromagnetic layer thicknesses over either conductive or nonconductive bases has also been accomplished. These systems make use of eddy current probes to determine layer thickness.

Eddy current probes utilize alternating current through a coil to generate a magnetic field. When placed near a ferromagnetic material, the modification of the magnetic field flux lines by the ferromagnetic material modulates the impedance of the coil. This modulation can be detected, and correlated with the thickness of the material.

With presently existing systems, the thickness of a nonferrous, nonconductive layer over a ferromagnetic base layer can be measured. The ferromagnetic layer contributes to the modulation of the probe's magnetic field, and its contribution must therefore be kept constant. The ferromagnetic base layer must therefore be either thick enough to appear infinitely thick to the magnetic field generated by the eddy current probe, or it must have a constant thickness. Thickness variations in the underlying ferromagnetic base layer will cause erroneous readings in the measurement of the overlying nonferrous, nonconductive layer.

In a similar manner, the thickness of a ferromagnetic layer over a conductive base layer may be measured. Assuming the conductive base layer to be thick enough that it appears infinitely thick to the probe, or constant in thickness, thickness variations in the ferromagnetic layer can be detected by the probe. Measurements in this manner require the probe to either be consistently in contact with the surface of the ferromagnetic layer, or to have a fixed standoff (air gap distance) between the probe and the surface of the ferromagnetic layer. The spacing, if any, between the probe and the ferromagnetic layer affects the modulation of the probe's magnetic field by the ferromagnetic layer, giving erroneous readings if the spacing is not kept constant.

An important disadvantage of these techniques is that they are not capable of simultaneously measuring both the thickness of a ferromagnetic layer over a conductive layer, and the thickness of a nonferrous, nonconductive layer over the ferromagnetic layer. Determinations of layer thickness cannot be made when both the ferromagnetic layer and the overlying layer have an undetermined thickness. Known techniques are also not capable of performing the virtually identical measurement, of the thickness of a ferromagnetic layer over a conductive layer, when the probe tip must be separated from the surface of the ferromagnetic layer by an unknown standoff. This type of situation arises when a ferromagnetic coating, which is still wet due to recent application, is measured using a robot to position the probe. Typically, the robot cannot maintain the probe distance from the surface of the ferromagnetic layer absolutely constant, which negatively impacts the accuracy Of the ferromagnetic layer thickness measurement.

It would be desirable to provide an improved system for measuring the thickness of a ferromagnetic layer over a conductive base layer. It would also be desirable for such a system to accurately measure the thickness of the ferromagnetic layer regardless of the presence of an overlying nonferrous, nonconductive layer, and regardless of a standoff of the probe from the upper surface of the ferromagnetic layer. It would further be desirable for such a system to be capable of determining the thickness of any such overlying layer, or the spacing of the standoff.

SUMMARY OF THE INVENTION

It is therefore an object of the present invention to provide a system for measuring the thickness of a ferromagnetic layer, over a conductive layer, in which the probe tip need not be in contact with the upper surface of the ferromagnetic layer.

It is another object of the present invention to provide such a system which can measure the standoff between the probe and the upper surface of the ferromagnetic layer, whether such standoff is provided by an overlying nonferrous, nonconductive layer or by an air gap.

Therefore, according to the present invention, a system is provided for measuring the thickness of a ferromagnetic layer formed over a conductive base layer. An eddy current probe is provided for measuring the thickness of the ferromagnetic layer. The eddy current probe can be placed in direct contact with the ferromagnetic layer, or it may be spaced above its surface by an unknown amount. This spacing may be caused by the presence of an overlying nonferrous, nonconductive layer applied over the ferromagnetic layer, or it may be an air gap over the ferromagnetic layer. An analog detector connected to the probe provides output values in two dimensions corresponding to the modulation of the probe's magnetic field by the ferromagnetic and conductive layers. These values are utilized to determine a mapping between the detector output values and ferromagnetic layer thickness and standoff values. The output of the mapping function provides two values, a ferromagnetic layer thickness and a standoff distance, which corresponds to the detected values. The mapping data table is generated by measuring an appropriate number of calibration objects having known thicknesses for the ferromagnetic layers and known standoffs, combined with interpolation techniques to generate data points between those which have been measured with the calibrated targets. The mapping function can be efficiently performed using a lookup table.

BRIEF DESCRIPTION OF THE DRAWINGS

In order to illustrate the features of the present invention, an illustrative embodiment is shown and described in the drawings and the following description.

DESCRIPTION OF THE PREFERRED EMBODIMENT

Figure 1:
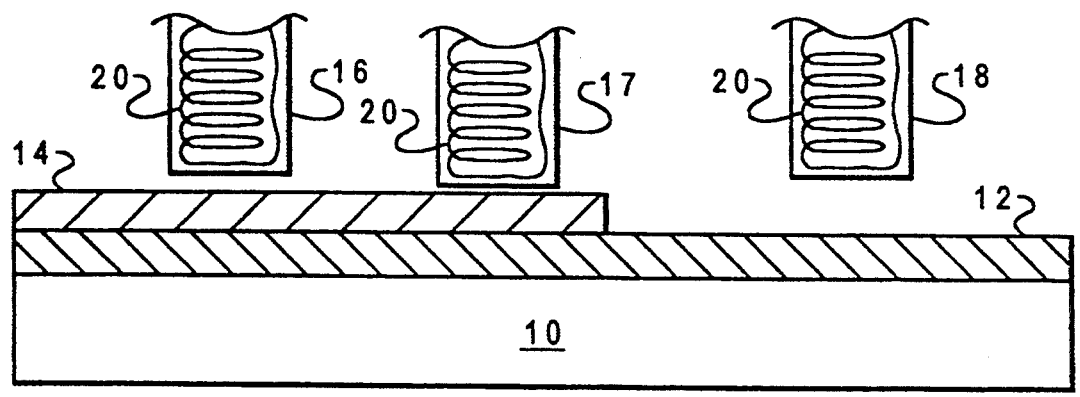
FIG. 1 is a cross-sectional diagram illustrating the use of a probe to measure layer thicknesses according to the present invention.

FIG. 1 illustrates a situation to which the measurement technique of the present invention may be applied. A conductive base layer 10 can be formed from a material such as aluminum. Conductive base layer 10 has a thickness which is great enough to appear, for practical purposes, as infinite to the probe. A base layer having a thickness of approximately 150 mils or more is sufficient for this purpose, depending on operating frequency and conductivity of the base layer material. Relatively thin base layers 10 can be used if they can be guaranteed to have a constant thickness, and have no underlying structures that would cause errors.

A ferromagnetic layer 12 is formed over the conductive base layer 10. Layer 12 is ferromagnetic and virtually nonconductive. In this context, virtually nonconductive means that any conductivity is small enough to have negligible effects on the measurement application described below. A ferromagnetic layer which is somewhat conductive can also be measured, so long as the conductivity is not too high to prevent the use of the calibration and measurement techniques described below. In the preferred embodiment, the thickness of layer 12 will be assumed to be between 0 and approximately 50 mils, but it will be appreciated by those skilled in the art that other thickness ranges may be detected by utilizing the principles described below. A top layer 14 is shown formed over a portion of the ferromagnetic layer 12. Top layer 14 is both nonferrous and nonconductive.

Three eddy current probes 16, 17, and 18 are shown disposed over the various layers 10, 12 and 14. Each probe contains a coil 20. The coils 20 act as inductors, and are driven by an alternating current signal of a selected frequency. This causes the coils 20 to generate magnetic fields which penetrate into, and through, the ferromagnetic layer 12. As is well known in the art, the thickness of the ferromagnetic layer, and the presence of the underlying conductive layer 10, affect the magnetic flux passing through them and thereby modulate the impedance of the coil 20. These changes can be detected by the circuitry driving the coils, and represented in a manner which can be used to detect the thickness of the various layers as described below.

Probe 16 is shown over the top layer 14, and separated therefrom by a small air gap. Probe 17 is shown in contact with the top layer 14. Probe 18 is shown as spaced from the ferromagnetic layer 12 without an intervening top layer 14. In all three cases, the distance between the probes 16, 17, 18, and the upper surface of the ferromagnetic layer 12 will be referred to as the standoff. The top layer 14 is neither conductive nor ferromagnetic, and behaves exactly as an air gap insofar as the magnetic field generated by the coil 20 is concerned.

The system described below is capable of simultaneously determining both the thickness of the ferromagnetic layer 12 and the standoff between the layer 12 and the probe. The standoff can be caused solely by top layer 14, as shown for probe 17, solely by an air gap as is shown for probe 18, or by a combination of air gap and top layer 14 as is shown for probe 16. If it is desired to precisely determine the thickness of the top layer 14 in addition to the ferromagnetic layer 12, the probe must be placed in contact with the upper surface of top layer 14 as shown for probe 17. In this case, the thickness of the top layer 14 is precisely the standoff from the ferromagnetic layer 12.

Figure 2:
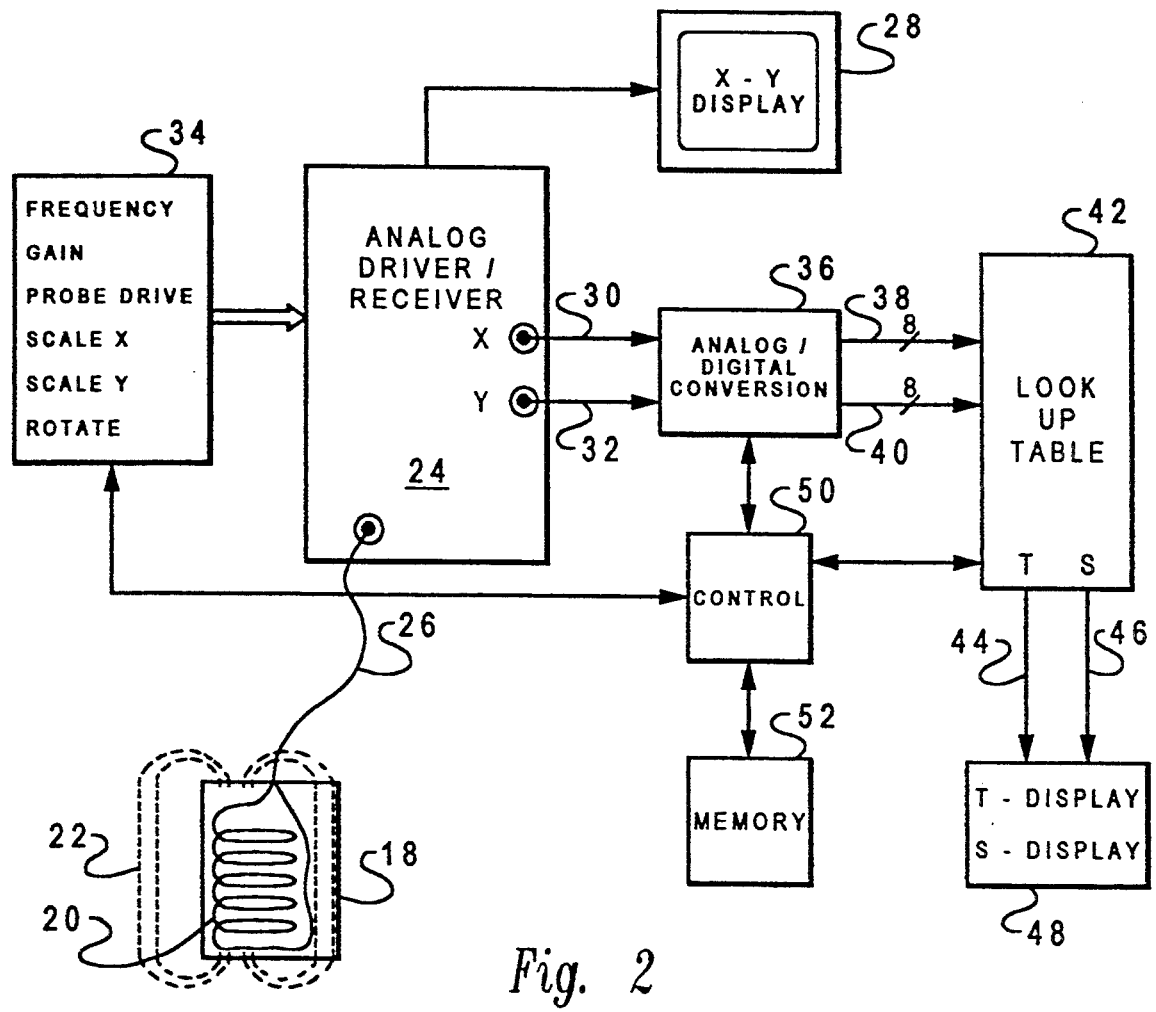
FIG. 2 is a block diagram of a system for measuring layer thicknesses in accordance with the present invention techniques.

Referring to FIG. 2, a system is shown for performing the simultaneous thickness and standoff measurements just described. Magnetic field lines 22 are shown as being generated by the coil 20 within probe 18. Probe 18 is connected to an analog driver/receiver 24 by a shielded cable 26. Analog driver/receiver 24 provides the alternating current used to excite the coil 20 within probe 18. It contains circuitry for detecting changes in the impedance of the probe be caused by the presence of, for example, ferromagnetic material near the probe. Changes in both resistance and inductance of the coil 20 may be caused by the presence of ferromagnetic and conductive materials near the probe be, enabling the analog driver/receiver to generate both X and Y analog outputs.

The driver/receiver 24 also drives an X-Y display 28. Preferably, the X and Y values used to indicate a point on the display correspond to the X and Y analog values generated at outputs 30, 32.

A number of characteristics of the analog driver/receiver 24 are modified and controlled by calibration circuitry 34. These include the frequency of the alternating current used to excite the coil 20, and the gain of the receiver used to detect changes which occur. The probe driver calibration controls the magnitude of the current supplied to the coil 20.

In addition, calibration of values related to the X and Y outputs generated at outputs 30, 32, and displayed on the display 28, can be made. The X and Y axes can be scaled independently, and if desired, the X and Y axes can be rotated. No rotation indicates that the horizontal axis is the resistive component of impedance and the vertical axis is the reactive component. Using the rotate feature causes these two axes, while remaining orthogonal, to be rotated from the horizontal and vertical when shown on X-Y display 28.

In the preferred embodiment, all of the parts of the system shown in FIG. 2 are incorporated into a single unit. However, some of the subparts may be provided separately and simply connected together in order to perform measurements in accordance with the invention. For example, the analog driver/receiver 24, the X-Y display 28 and the calibration controls 34 are available as stand alone eddy current instruments which are available to the marketplace. An example of one such unit is the Zetec MIZ-40 eddy current instrument. This instrument provides all of the controls and capabilities just described, and generates two analog output values 30, 32 as described.

The two output signals 30, 32 are connected to a dual-channel analog/digital conversion unit 36. The analog/digital converter 36 generates two digital outputs 38, 40 corresponding to the analog inputs 30, 32. As shown in the preferred embodiment, each of the digital outputs 38, 40 is an 8 bit output, but digital signals having different resolution, such as 12 or 16 bits, may be used if desired.

The digital values 38, 40 are used as address values to address a location in a lookup table 42. It will be appreciated by those skilled in the art that the lookup table 42 may be a hardware memory device, or may be a lookup table stored in the main memory of a microprocessor or other computer system. This allows for easy implementation of a flexible, modifiable system. For each location in the lookup table 42 addressed by a combination of the two unique digital values 38, 40 two outputs are provided. These are a thickness output 44 and a standoff output 46. The outputs 44 and 46 are preferably digital values which may be, for example, in binary or BCD format. The values output from the lookup table 42 are connected to a display 48 which displays both the thickness of the ferromagnetic layer (T-display) and the standoff of the probe from the upper surface of such layer (S-display).

When the system is fabricated as a single unit, control unit 50 is used to control the various activities of the system. A memory 52 is used to store data and programs for the control unit 50. As will be described below, utilization of this system requires certain calibration functions to be performed. These calibration functions will involve the setting, and variation, of various of the calibration controls 34. Once suitable parameters have been selected, control values for these parameters can be detected by the control unit 50 and stored for further use. This allows the system to be reconfigured using different sets of calibration parameters, by simply recalling stored parameters which were determined at an earlier time.

The calibration process provides the entries for the lookup table 42. The X and Y outputs provided on lines 30, 32 are only proportional to the change in the impedance of the probe 18. They do not directly indicate the thickness of the ferromagnetic layer or the standoff distance. However, when the system is properly calibrated, the X and Y outputs 30, 32 define a point in a coordinate plane. Each location on that coordinate plane will uniquely define both a ferromagnetic layer thickness and a standoff value. The mapping between the X-Y grid, or coordinate plane, and the thickness and standoff values, are stored in the lookup table 42.

Figure 3A:
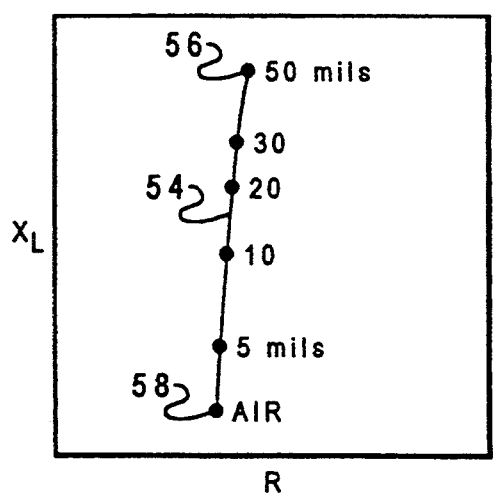
FIGS. 3a and 3b are contains two graphs illustrating measurements of single layer thicknesses.
Figure 3B:
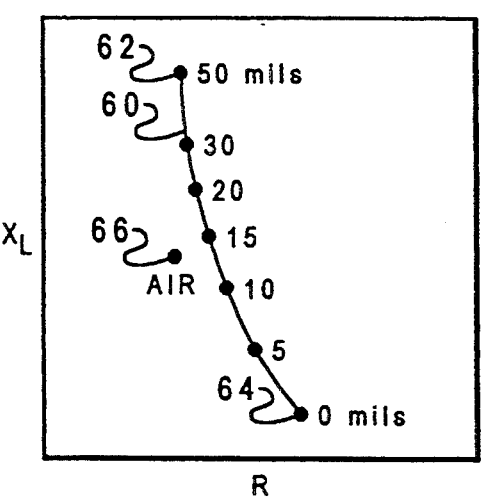

FIGS. 3(a) and 3(b) illustrate the detection of layer thicknesses using eddy current probes. FIG. 3(a) illustrates the measurement of the thickness of a ferromagnetic layer. The ferromagnetic layer is not formed over a conductive base, and the probe tip remains in firm contact with the surface of the ferromagnetic layer. As can be seen in FIG. 3(a) primarily the reactive component of the probe tip impedance increases as the thickness of the ferromagnetic layer increases. In FIG. 3(a), values are shown for a thickness of the ferromagnetic layer ranging from a maximum of 50 mils down to a minimum of 0 mils, which is the response of the probe when supported in air with no ferromagnetic material nearby. It can be seen that the unknown thickness of a ferromagnetic layer may be determined by placing the probe in contact with the layer, and measuring the location along the curve shown in FIG. 3(a) which results.

It will be appreciated that, during an actual measurement, the curve 54 of FIG. 3(a) may or may not actually be generated. When the probe is stationary, only a single X-Y point is generated. That point will have X and Y coordinates defined by the resistive and reactive components of the probe impedance as modified by any nearby ferromagnetic material. The X component, resistance, changes very little when such a measurement is made, with the reactive component primarily being affected. The measured point will fall somewhere on the curve 54. When the probe is moved relative to the layers being measured, the X-Y point will move across the screen as the probe's impedance varies. When a display having storage capabilities is used, a curve similar to curve 54 will actually be generated as the probe approaches the ferromagnetic layer.

If the probe is separated from the ferromagnetic layer by an air gap, measurement of the layer's thickness is confounded. In general, separating the probe from the ferromagnetic layer has the same impact on the measured impedance as does providing a thinner ferromagnetic layer. Thus, if a ferromagnetic layer having a thickness of 50 mils is provided, the point 56 will be measured when the probe is in direct contact with the ferromagnetic layer. As the probe is moved away from the ferromagnetic layer, the resulting coordinate point moves down the curve 54 toward the point 58. When the probe is far enough from the ferromagnetic layer, for all practical purposes it is in air and unaffected by the presence of the ferromagnetic layer. For ferromagnetic layers having a thickness of approximately 50 mils or less, and using probe frequencies of approximately 5 kilohertz and higher, an air gap of greater than approximately one hundred mils results in the same impedance reading for the probe as in air.

Thus, with a 50 mil thick ferromagnetic layer, and a separation of a few tens of mils between the probe and the surface of the layer, a thickness reading of less than 50 mils will be obtained. If the standoff between the probe and the ferromagnetic layer is absolutely constant, the unit may be recalibrated in order to provide proper readings. However, in many cases it is not possible to maintain this standoff constant within a few mils, and the reading of the ferromagnetic layer thickness will not be accurate. Small changes in the standoff will be reflected as thickness variations in a ferromagnetic layer, which is, in fact, constant. Likewise, thickness variations in the ferromagnetic layer may be misread as variations in the standoff. Since the curve 54 is basically one dimensional, it cannot accurately represent the two dimensional phenomena of both a variable thickness and standoff.

FIG. 3(b) illustrates a curve obtained for various thicknesses of the ferromagnetic layer over a conductive base. For purposes of the present discussion, the conductive base is assumed to be thick enough to appear infinite insofar as the probe is concerned. However, if a thin (appearing finite to the probe) conductive base has a constant thickness, a similar rationale applies. If a thin, constant thickness base is used, there must be no underlying conductive or ferromagnetic structures which would affect the probe's magnetic field.

Curve 60 indicates the relative variation in impedance of the probe for ferromagnetic layers having a thickness between 50 mils (point 62) and 0 mils (point 64). This curve is seen to be similar to that shown in FIG. 3(a). However, due to the contribution of the underlying conductive layer, the resistive component of the probe impedance, along with the reactive component, changes with the thickness of the ferromagnetic layer. For thick ferromagnetic layers, the contribution of the underlying conductive layer is very low, and the change in impedance compared to that of air (point 66) is almost purely reactive. As the ferromagnetic layer becomes thinner, the underlying conductive layer begins to have an effect. As shown by the curve 60, the inductance of the probe decreases for thinner ferromagnetic layers, and the resistance increases.

Curve 60, as was the case for curve 54, is valid for a probe which is either in contact with the ferromagnetic layer, or at a fixed distance above its surface. As the probe is moved away from the ferromagnetic layer, the impedance of the probe moves from its point on the curve 60 toward the air value 66. Thus, if the thickness of the ferromagnetic layer is 50 mils, and the probe is moved away from the surface, the measured coordinate value for the probe impedance will move between point 62 and point 66.

Figure 4:
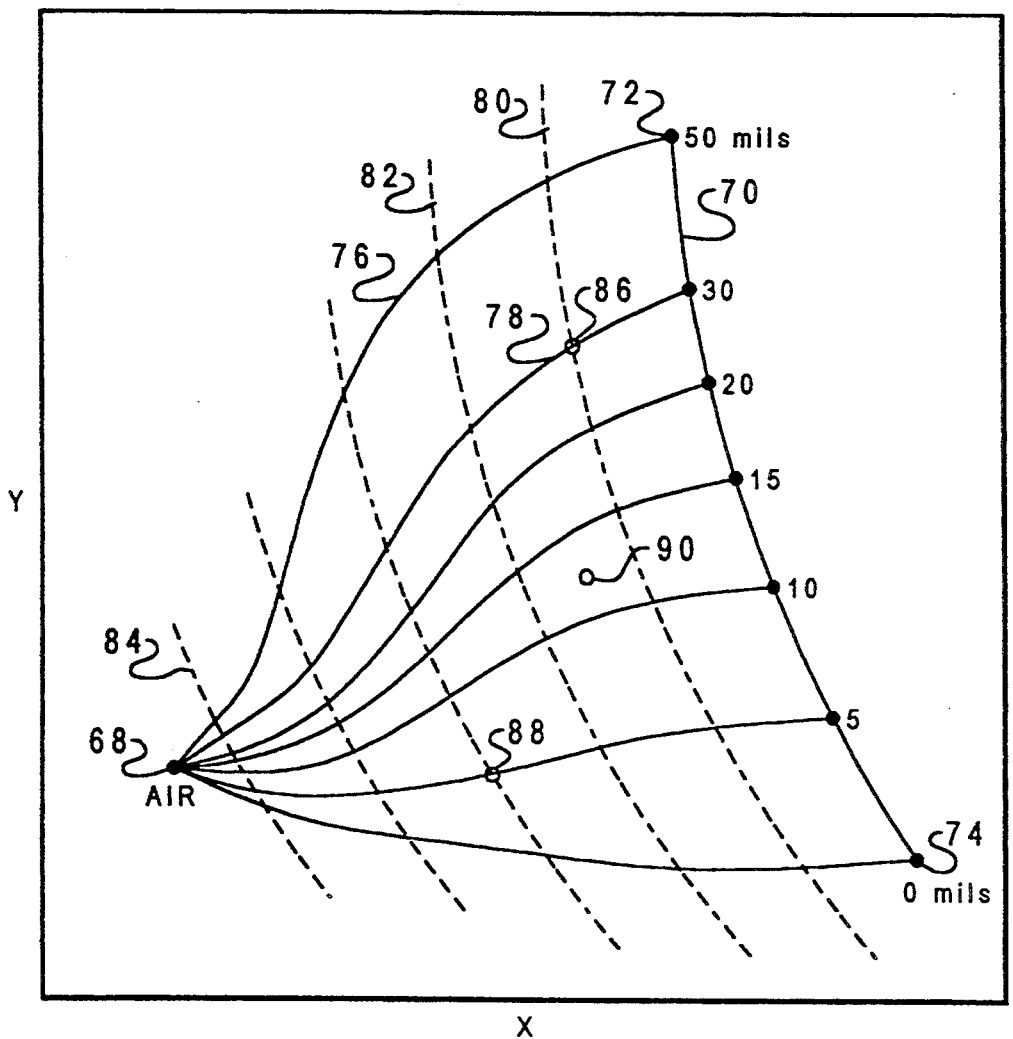
FIG. 4 is a diagram illustrating a family of curves utilized with the present invention.

This property is utilized by the present invention in order to be able to detect both the thickness of a ferromagnetic layer over a conductive layer and any standoff due to an air gap or an overlying top layer. FIG. 4 illustrates a family of curves used for such determination. Point 68 represents the impedance of the probe in air. Curve 70 represents the impedance for various thicknesses of the ferromagnetic layer when the probe is in direct contact with its surface. Point 72 is the value obtained when the ferromagnetic layer has a thickness of 50 mils with the probe in contact with the ferromagnetic layer, and point 74 is the impedance obtained when the probe is in direct contact with the underlying conductive layer with no ferromagnetic layer provided at all.

The solid lines of FIG. 4 are lines of constant ferromagnetic layer thickness and varying standoff distance. For example, line 76 is the 50 mil thickness line, with the standoff varying from 0 at point 72 to, effectively, infinity at point 68. Line 78 is the corresponding line for a ferromagnetic layer thickness of 30 mils, with the other solid lines representing various thicknesses as shown.

The broken lines of FIG. 4, with the inclusion of solid line 70 represent lines of a constant standoff distance. Line 70 represents direct contact, which corresponds to a standoff of 0. In this example, line 80 represents a standoff of 10 mils, while line 82 represents a standoff of 20 mils. The remaining broken lines represent lines of constant standoff distances at 10 mil intervals, up to line 84 which corresponds to a standoff of 50 mils.

It will be appreciated that the intersection of a line of constant thickness with a line of constant standoff corresponds to a unique combination of ferromagnetic layer thickness and probe standoff. For example, the intersection point 86 of line 78 and line 80 corresponds to a ferromagnetic layer having a thickness of 30 mils, with a probe standoff of 10 mils. Point 88 corresponds to a ferromagnetic layer thickness of 5 mils and a probe standoff of 30 mils. Point 90 is an intermediate point corresponding to a ferromagnetic layer thickness of approximately 12 mils, and a probe standoff of approximately 15 mils.

When the probe is placed adjacent to a ferromagnetic layer, with or without a standoff, a single X-Y coordinate is generated at the outputs 30, 32 of the analog driver/receiver 24 (FIG. 2). As shown on the X-Y coordinate system of FIG. 4, this point maps to a unique ferromagnetic layer thickness and standoff. As described earlier, the standoff can be caused by an air gap between the probe and the ferromagnetic layer, or a nonferrous, nonconductive top layer which behaves essentially as an air gap, or both. When this analog X-Y coordinate is digitized, it is used as the address into lookup table 42 of FIG. 2. The lookup table 42, as described earlier, provides the mapping between the X-Y coordinate values, and the corresponding thickness and standoff values.

In order to properly initialize the system of FIG. 2 prior to use, it is necessary to calibrate the analog driver/receiver 24, and measure, calculate, and store the appropriate values into the lookup table 42 to perform the mapping function. Increasing the gain and probe drive current of the unit 24 helps increase the sensitivity of the probe, although probe should not be driven so high that the sensing circuits are driven into saturation. Changing the frequency used to drive the probe also changes the shape and location of the curves shown in FIG. 4. It has been found that a relatively low frequency, such as 5 kilohertz, provides excellent results. For this relatively low frequency, the underlying base, if aluminum, should be greater than approximately 100 mils thick, or have a constant thickness as described above. In order for this technique to work properly, it is desirable for the magnetic field generated by the probe to extend into the conductive layer, even for relatively thick layers of ferromagnetic material, and this effect is enhanced by using lower frequencies. If the probe frequency is too high, even a moderately thick ferromagnetic layer appears practically infinite to the probe, meaning that little penetration of the magnetic field into the conductive base layer occurs. In such case, the desired maximal separation of constant thickness curves is not obtained.

The X and Y values can be scaled in order to cause the family of curves shown in FIG. 4 to substantially fill the screen as shown. In addition, the resistance and reactance axes can be rotated in order to maximize the extent to which the family of curves fills the available X-Y coordinate plane. A series of curves having approximately the appearance shown in FIG. 4 is fairly optimal for the present technique.

The mapping, necessary to provide values for the lookup table 42, is performed after the various calibrations have been performed to optimize sensitivity of the probe and its driving circuitry as described above. In the embodiment described in FIG. 2, the X and Y analog outputs are digitized to an 8 bit value. Thus, 256 possible positions are available in each of the horizontal and vertical axes as shown in FIG. 4, resulting in 64K data points on the coordinate grid. Some of these data points fall outside the family of curves, and the lookup table should have an appropriate corresponding value indicating that this is a nonvalid coordinate location. All coordinate points located on, or within, the perimeter of the family of curves shown in FIG. 4 will map to a single (thickness, standoff) pair. Once all of these pairs are stored in the lookup table, the system is ready to use.

In order to initially calibrate the system, it is necessary to provide a number of test structures having precisely determined ferromagnetic layer thicknesses and standoffs. Such a set of structures can be provided by, for example, providing ferromagnetic layer thicknesses ranging between 0 and 50 mils, in steps of 5 mils, on aluminum or other conductive bases. Measuring the impedance of the probe at 3 points, in air, on the 50 mil test structure, and on the 0 mil test structure, will result in data points 68, 72, and 74 as shown in FIG. 4. These three points, defining approximately the limits of the periphery of the family of curves, can be used during the initial calibration stage to fit the family of curves so as to fill up most of the available X-Y coordinate plane. By varying the calibration controls 34 as described above, these three points can be properly placed. Once these three points are placed the calibration settings are considered fixed, and may be stored for future reference by the central control 50 if such a capability is provided.

The next step is to measure a set of coordinate points corresponding to the thicknesses of the provided test structures. This will give a series of test points, separated at 5 mil intervals, defining curve 70. Then, measurements are taken of each of the test structures using known standoffs. This can be done, for example, by providing thin sheets, having a known thickness, between the ferromagnetic layer 12 and the probe. Thin mylar sheets having accurately known thicknesses can be used for this purpose. If, for example, each of the mylar sheets has a thickness of 5 mils, a set of points along each constant thickness curve can be obtained for each test structure. For example, a series of points along curve 76 of FIG. 4 is obtained by using 0, 1, and more sheets of 5 mil mylar between the probe and the 50 mil test structure.

Performing this operation with various numbers of sheets for all of the test structures provides a set of points which defines the curves shown in FIG. 4. In many cases, it will be necessary to provide thickness and standoff measurement accuracy to within 1 mil. In practice, it is extremely cumbersome to provide test structures having ferromagnetic layer thicknesses which differ by only a single mil, and to provide thin sheets having various thicknesses which can be stacked to measure standoffs only 1 mil apart. Because all of the curves are fairly regular, and in fact nearly linear within a short span, it is preferable to measure, as described above, only a few points at intervals such as 5 mils, and interpolate to obtain the intermediate points. For ferromagnetic layer thicknesses of 0 to 50 mils, and having possible standoffs of 0 to 50 mils, a 1 mil resolution would require approximately 2500 data points. Measuring these values at intervals of 5 mils requires only approximately 120 data points, and interpolation of the remaining data points is easily accomplished using mathematical techniques such as those discussed in connection with FIG. 5.

Once all of the data points have been measured and interpolated, it is necessary to map each possible output combination from the X and Y outputs 30, 32 to these data points. Because approximately 65000 coordinate positions are possible for X and Y coordinates having 8 bits of resolution, and only approximately 2500 data points are necessary for a 1 mil resolution grid, it is apparent that several coordinate grid locations will typically map to a single data point. A data point is defined as a unique (thickness, standoff) pair, and may have any number of X-Y coordinate points mapped to it.

It will be apparent to those skilled in the art that the family of curves illustrated in FIG. 4 is dependent upon a number of factors. As described above, the frequency of the alternating current used to excite the probe is important, as are the various sensitivities and scaling factors of the analog driver/receiver unit 24. In addition, different ferromagnetic materials have different properties. Thus if a different ferromagnetic material is used for the ferromagnetic layer 12 the system must be recalibrated for this new material. Accuracy will also depend on how consistent the ferromagnetic material is from one batch to another. Any variations in the ferromagnetic properties at the frequency of the probe will cause the resulting determined thicknesses to be inaccurate.

In the preferred embodiment, a central control unit 50 is used to control and monitor all portions of the system. Thus, once the calibration controls 34 have been set to their proper positions, these values can be read by the control unit 50 and stored away for future use. This allows the system to be easily used with different types of ferromagnetic material by collecting and maintaining separate sets of data for such different ferromagnetic materials. The lookup table 42 is then loaded with the data appropriate to the ferromagnetic material currently being measured.

In a similar manner, the properties of the underlying conductive layer also have an impact on the curves shown in FIG. 4. Typically, the underlying conductive layer will be a layer such as aluminum. However, if another layer is used, the family of curves will be different. Thus, it is important to calibrate the system for the proper conductive layer/ferromagnetic layer combination which is to be tested.

Figure 5:
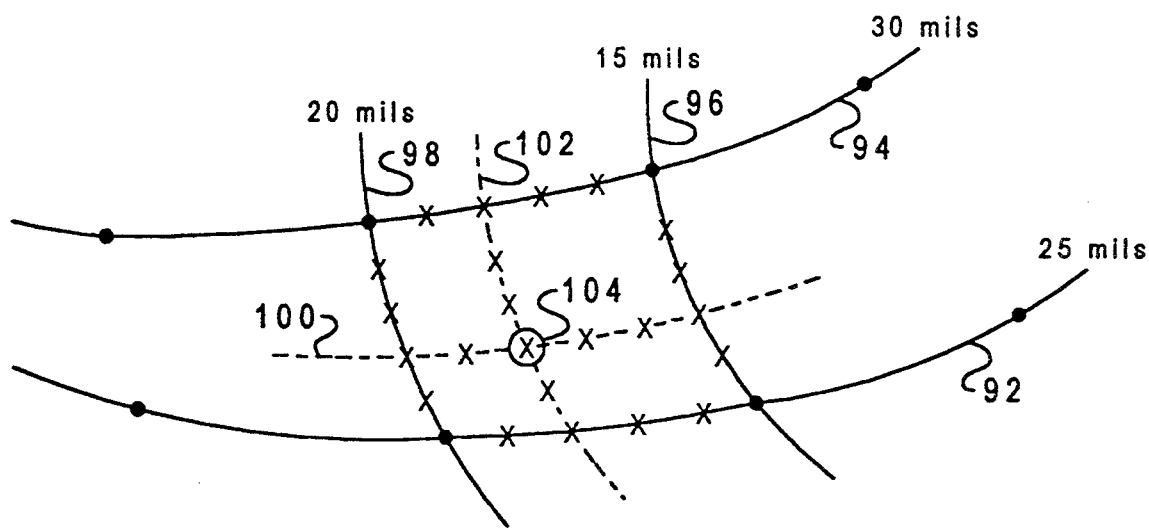
FIG. 5 is a portion of the family of curves of FIG. 4 illustrating an interpolation technique utilized with the present invention.

FIG. 5 illustrates the simplicity of the interpolation process. A flowchart for performing this mathematical step in a computer system is not provided separately, inasmuch as implementation of this technique will be easily performed by those ordinarily skilled in the art.

In FIG. 5, curves 92 and 94 are the constant thickness curves for a ferromagnetic layer having a thickness of 25 and 30 mils, respectively. Curves 96 and 98 represent the constant standoff curves for standoffs of 15 and 20 mils, respectively. All of the solid dots of FIG. 5 represent (thickness, standoff) pairs actually measured using the techniques described above. Using well known techniques, an equation can be derived for each of the curves 92, 94, 96, and 98 using the data points which define those curves. Once an equation is derived for each curve, it is a relatively simple matter to interpolate (thickness, standoff) pairs for the intermediate points for a 1 mil resolution. These interpolated intermediate points are represented by the "X" locations along the curves 92, 94, 96, and 98.

Once this first set of intermediate points has been located, it is necessary to locate all of the intermediate points in the areas bounded by the pairs of solid curves 92, 94, 96, and 98. First, equations are calculated for the broken curves 100, 102 using the intermediate data points which were calculated in the first stage. Although only two curves are shown in FIG. 5, such a calculation is made for all constant thickness and constant standoff curves. Thus, the equations for four additional curves are calculated between curves 92 and 94, and likewise equations are calculated for four additional curves between curves 96 and 98.

Once this second set of intermediate curves has been calculated, all of the remaining (thickness, standoff) pairs are located at the intersections of such curves. This is illustrated, for example, by point 104, which is located at the intersection of curves 100 and 102. Point 104 corresponds to the (thickness, standoff) pair (27, 18).

Once all of the (thickness, standoff) pairs have been calculated, it is necessary to provide a mapping between the X-Y coordinates generated by the sensing circuitry and the set of all such pairs. This may be done using any number of widely available mathematical techniques in common use. Two such techniques are illustrated graphically in FIGS. 6 and 7.

To perform the interpolation process within a computer system, an array representing the possible (thickness, standoff) pairs can be utilized, The pairs which are read from the test structures are stored into the table, followed by the interpolation process. The interpolation process fills in the spaces in the table until all possible (thickness standoff) pairs have a corresponding (X,Y) coordinate. The data in this table is then converted to an (X,Y) table wherein each entry has the corresponding (thickness, standoff) values. Using the examples above of 0–50 mils for both the thickness and standoff values, the first table will have $51^2$ or 2601 entries. For X and Y values having 8 bits of resolution, the X-Y table will have $256^2$, or 65,536 entries. Thus, the X-Y table, which acts as lookup table 42, is relatively sparse, and must be filled in prior to use.

Figure 6:
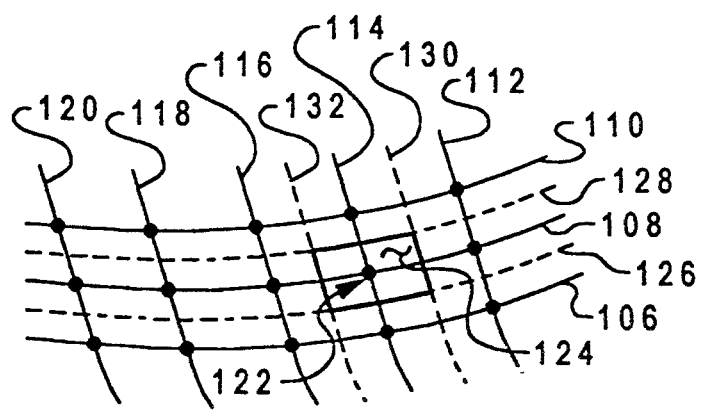
FIGS. 6 and 7 depict data points utilized with the present invention for mapping X-Y coordinates to measured and calculated data points.

FIG. 6 represents a technique which could be referred to as a "graphical fill" approach. In FIG. 6, the dots each represent (thickness, standoff) pairs after the interpolation calculations have been made. Curves 106, 108, 110 represent constant thickness curves. Curves 1112, 114, 116, 118, and 120 represent constant standoff curves.

In order to perform the mapping calculation, a region of a surface is associated with each (thickness, standoff) pair. For example, point 122 represents the pair at the intersection of curves 108 and 114. Region 124 is the region associated with point 122. Region 124 is bounded by curves 126, 128, 130, and 132. These curves, indicated by broken lines in FIG. 6, are curves which are calculated to be halfway between the pairs of solid line curves on either side. Given the equations for the curves 106, 108, 110, 112, 114, 116, 118, and 120, which were used for the interpolation step illustrated in FIG. 5, the equations for curves 126, 128, 130, and 132 are easily determined.

Once all of the regions corresponding to the (thickness, standoff) pairs have been determined, the mapping of X-Y coordinates is straightforward. Since all of the curves are defined in terms of the X-Y coordinate system, any particular X-Y coordinate value can be located within one of the regions 124. For each possible X-Y coordinate point which is located within the perimeter of the family of curves shown in FIG. 4, a determination is made as to the region 124 in which this coordinate point is located. The (thickness, standoff) pair corresponding to that region 124 is then stored in the lookup table 42 for that X-Y coordinate entry.

Figure 7:
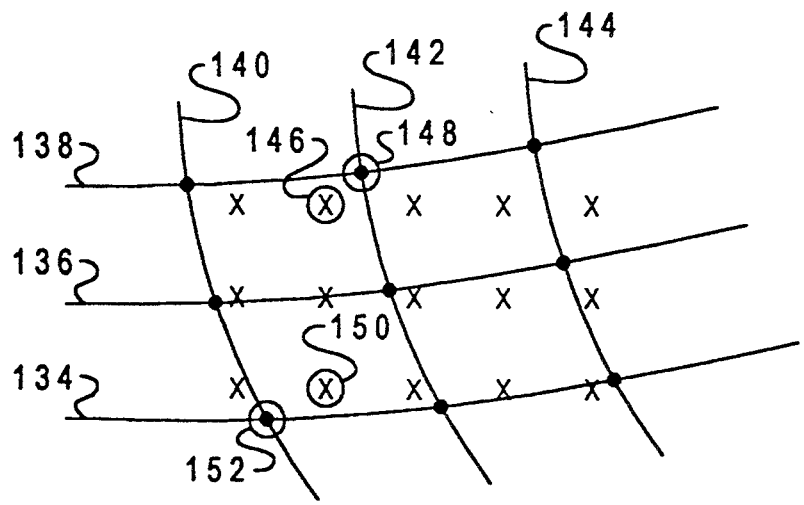

FIG. 7 illustrates a similar technique for performing the mapping. In FIG. 7, curves 134, 136, and 138 are constant thickness curves. Curves 140, 142, and 144, are constant standoff curves. The dots located at the intersection of each curve are the (thickness, standoff) pairs. The Xs in FIG. 7 represent the X and Y coordinate values which can be generated by the sensing circuitry. If the analog values are digitized using more bits, the Xs will be closer together. It can be seen that the Xs are located on a rectangular coordinate grid corresponding to the X-Y coordinate plane, while the curves 134, 136, 138, 140, 142 and 144 are not.

In this technique, each of the coordinate points is mapped to the (thickness, standoff) pair which lies closest to it in the X-Y plane. For example, X-Y coordinate point 146 is mapped to point 148, which represents a (thickness, standoff) pair. In a similar manner, point 150 is mapped to point 152, which is closest to it in the X-Y plane.

Determining the distance between two points in a rectangular coordinate plane is extremely simple and very well known to those skilled in the art. Thus, it is necessary only, for each X-Y point, to calculate the distances to a few near by (thickness, standoff) pairs. The (thickness, standoff) pair which is the shortest distance away is placed into the corresponding entry into the lookup table 42. It will be apparent to those skilled in the art that the two alternative techniques shown in FIGS. 6 and 7 may give different mappings for a few X-Y coordinate points. However, both mappings are reasonably accurate, and within the resolution of the sensing equipment. In the examples described above, wherein (thickness, standoff) pairs are calculated using a 1 mil resolution and assuming the materials in the actual layers are the same as those in the test structures, the values read from the lookup table will always be within 1 mil of the value sensed by the probe.

Figure 8:
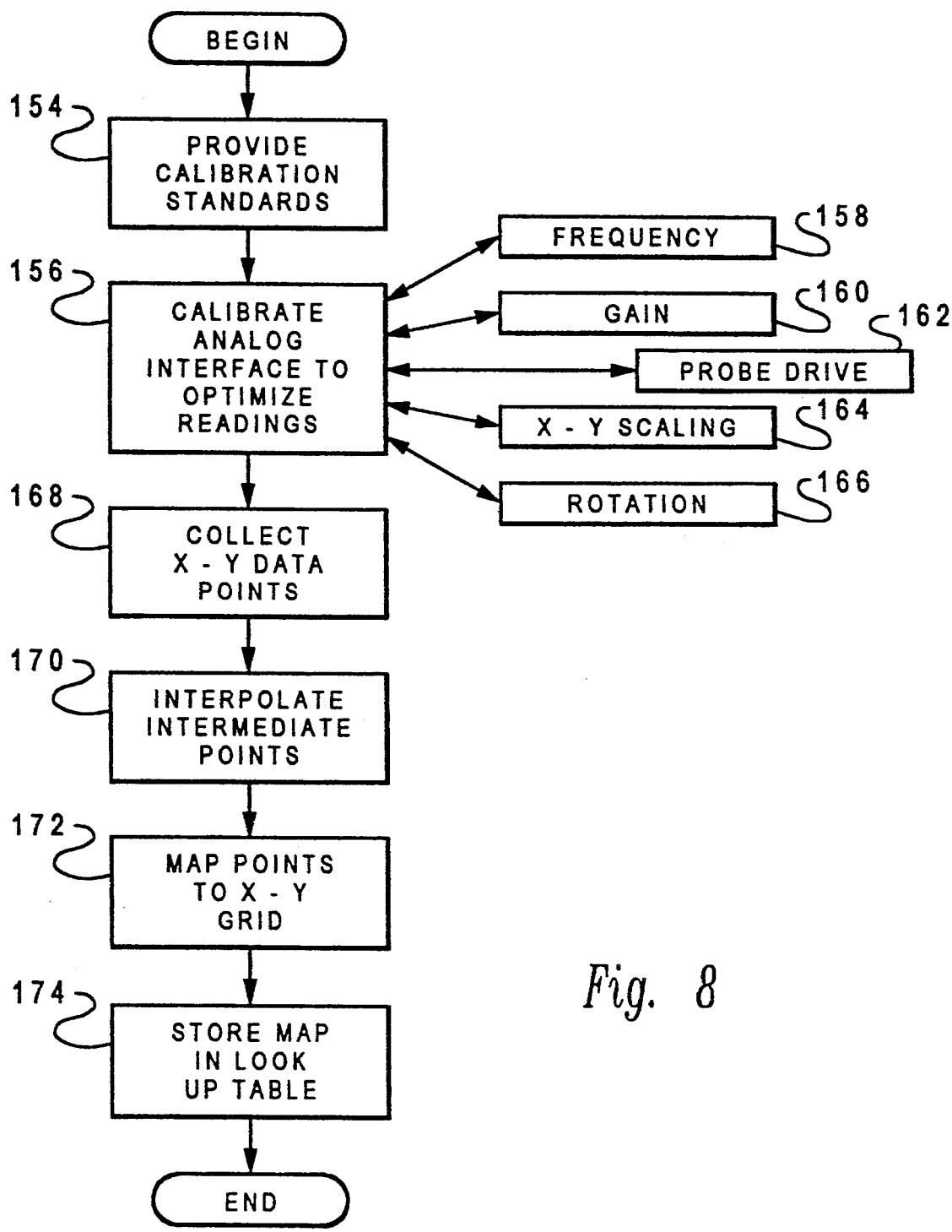
FIG. 8 is a flowchart depicting a preferred process for calibrating the system in accordance with the present invention.

FIG. 8 is a flowchart outlining the calibration process described above. Initially, calibration standards are provided 154. This is preferably done through the use of the test structures having different thicknesses of ferromagnetic material as described above, but may be accomplished by other means. Next, the analog interface is calibrated to optimize the readings. As described above in connection with FIG. 4, this results in a family of curves having maximal separation between the various curves, and preferably filling as much of the X-Y coordinate plane as possible. This calibration is performed by adjusting the frequency used to drive the probe 158, the gain of the impedance sensing circuitry 160, the magnitude of the alternating current used to drive the probe 162, the X and Y scaling factors 164, and the rotation of the X and Y values from the vertical and horizontal axes 166.

Next, the X and Y data points are collected 168. corresponding to the (thickness, standoff) pairs provided by the test structures. Next, the intermediate points corresponding to the intermediate (thickness, standoff) pairs are interpolated 170. The points on the X-Y grid are then mapped to the (thickness, standoff) pairs 172, and this mapping data is stored in the lookup table 174.

It will be appreciated by those skilled in the art that various modifications may be made to the individual aspects of the system described above. For example, as described in connection with FIG. 2, the entire system may be provided as a single unit, or composed of several widely available parts connected together. The precise techniques described for performing the interpolation and mapping calculations are not required, and any suitable alternative technique may be used. In general, the concept is to calibrate the drive and sensing equipment so that a useful spectrum of two dimensional coordinate values is generated corresponding to the desired range (thickness, standoff) values. This allows a mapping function to be calculated which maps a sensed value on an unknown structure to a unique (thickness, standoff) pair. Because the raw, sensed data varies in two dimensions, two degrees of freedom are provided. This allows determination of two variable values to be made, in this case the thickness of the ferromagnetic layer and the spacing of the standoff. If the standoff is provided by an overlying nonferrous, nonconductive top layer, this standoff is interpreted as the thickness of such top layer.

Other variations may become apparent to those skilled in the art. For example, the preferred embodiment was described in conjunction with the use of an X-Y rectangular coordinate system being mapped to the (thickness, standoff) values. However, a polar or other coordinate system could be used if such can be provided by the analog driver/receiver 24.

The system described above may be used in several different ways once it has been calibrated. It may, of course, be used as described to measure the ferromagnetic layer thickness simultaneously with the standoff. If only one of the standoff distance or the ferromagnetic layer thickness is needed, only that value need be considered. For example, if the ferromagnetic layer cannot be physically contacted for some reason, a robot arm can be used to hold the probe and measure its thickness. The robot arm can hold the probe well away from the layer to be measured, and then move the probe toward the layer. When the probe approaches within a few tens of mils of the surface, the thickness of the ferromagnetic layer can be determined without respect to the precise standoff value. The probe standoff value can be used as a control signal in a feedback loop for the robot arm to keep the probe from touching the surface of the ferromagnetic layer, but within a standoff range close enough to measure the thickness of the ferromagnetic layer. Once a good reading is obtained of the ferromagnetic layer thickness, the robot arm can move the probe to another location. In this manner, the thickness of the ferromagnetic layer can be measured at various points very quickly, even using a robot arm which does not provide precise control over its position relative to the ferromagnetic layer.

In the preferred embodiment, a lookup table 42 is used to provide the mapping between the sensed X-Y value and the corresponding (thickness, standoff) pair. However, other techniques could be substituted. For example, equations corresponding to the curves of FIG. 4 could be stored instead, with the mapping calculated as the probe is sensing the layers. This requires a greater amount of available processing power, but could provide increased accuracy. For most applications, a lookup table will probably be preferred for performance reasons.

Another technique which could be used to decrease the amount of computation needed to originally calibrate the system involves the use of standard response curves. It could be assumed that any material has a family of response curves similar to that shown in FIG. 4. One such family could be prestored in the system. Then, as few as three test points are measured, these preferably being the impedance in air, and the impedances for thickness of 0 and 50 mills with the probe in contact. The calibration controls 34 are then manipulated to bring these three measured points into coincidence with the corresponding locations on the standard family of curves. Once this has been done, the system is calibrated and ready for use. This has the advantage of extreme simplicity of use, but is less accurate unless the particular material being tested has exactly the same response as the material used to develop the standard curve family.

While the invention has been particularly shown and described with reference to a preferred embodiment, it will be understood by those skilled in the art that various changes in form and detail may be made therein without departing from the spirit and scope of the invention.

What is claimed is:

1. A system for measuring a thickness of a ferromagnetic layer formed over a conductive base layer, comprising:
   an eddy current probe for placement at a location adjacent the ferromagnetic layer;
   a driver unit for exciting the probe with an alternating current having a magnitude and a frequency, and for sensing an impedance thereof, the driver unit providing a low frequency alternating current for exciting the probe, and providing two analog output signals proportional to such impedance;
   an analog to digital converter for converting the analog output signals to digital signals;
   means, connected to the analog to digital converter, for generating values, corresponding to the two output signals, indicating the thickness of the ferromagnetic layer and a standoff distance between the probe and the ferromagnetic layer;
   a display connected to the generating means for displaying the thickness and standoff indicated by the generating means;
   means for setting the frequency and magnitude of the current used by the driver unit to excite the probe; and
   a controller for storing settings defining the frequency and magnitude for the current used to excite the probe.

2. The system of claim 1, wherein the means for setting the frequency and magnitude of the current used by the driver unit further comprises:
   means within the driver unit for controlling an amplification applied to the two analog output signals provided by the driver unit.

3. The system of claim 2, wherein the means for controlling an amplification further comprises means for controlling X and Y display amplification factors utilized by sensing circuitry within the driver unit.

4. The system of claim 1, wherein the driver unit, converter, generating means, and display comprise a single unit, and further comprising a central control subsystem connected to the driver unit, converter, generating means, and display for controlling the operations thereof.

5. The system of claim 1, wherein the driver circuit provides an alternating current having a frequency of approximately 5 kilohertz for exciting the probe.

6. A system for measuring a thickness of a ferromagnetic layer formed over a conductive base layer, comprising:
   an eddy current probe for placement at a location adjacent the ferromagnetic layer;
   a driver unit for exciting the probe with an alternating current having a magnitude and a frequency, and for sensing an impedance thereof the driver unit providing a low frequency alternating current for exciting the probe, and providing two analog output signals proportional to such impedance;

an analog to digital converter for converting the analog output signals to digital signals;

means, connected to the analog to digital converter, for generating values, corresponding to the two output signals, indicating the thickness of the ferromagnetic layer and a standoff distance between the probe and the ferromagnetic layer, wherein said generating means includes a lookup table connected to the analog to digital converter, wherein the digital signals address an entry in the lookup table, and wherein the entries in the lookup table contain values indicating both the thickness of the ferromagnetic layer and the standoff distance; and a display connected to the generating means for displaying the thickness and standoff indicated by the generating means.

7. The system of claim 6, wherein the lookup table comprises a hardware memory device.

8. The system of claim 6, wherein the lookup table comprises a memory region within a computer memory.

9. A method for measuring a thickness of a ferromagnetic layer formed over a conductive base layer, comprising the steps of:

controlling the magnitude and frequency of a signal used to drive an eddy probe to optimize the sensitivity of a signal used to sense changes in impedance of the probe;

measuring a plurality of known thicknesses of ferromagnetic material, and determining values for the thicknesses and standoff distances corresponding to all possible combinations of the first and second signals;

driving the eddy current probe with a low frequency alternating current;

placing the probe at a location adjacent the ferromagnetic layer, and separated therefrom by a standoff distance;

sensing changes in the impedance of the probe caused by the presence of the ferromagnetic and conductive base layers;

generating first and second signals proportional to the sensed changes in impedance;

using the first and second signals, determining corresponding values representing the thickness of the ferromagnetic layer and the standoff distance; and displaying the mapped thickness and standoff distance.

10. The method of claim 9, wherein the first and second signals comprise X and Y coordinate values on a coordinate plane.

11. The method of claim 9, further comprising the step of:

storing the thickness and standoff values in a lookup table.

12. The method of claim 9, wherein the driving step comprises the step of:

driving the eddy current probe with an alternating current having a frequency of approximately 5 kilohertz.

13. A method for measuring a thickness of a ferromagnetic layer formed over a conductive base layer, comprising the steps of:

driving an eddy current probe with a low frequency alternating current;

placing the probe at a location adjacent the ferromagnetic layer, and separated therefrom by a standoff distance;

sensing changes in impedance of the probe caused by the presence of the ferromagnetic and conductive base layers;

generating first and second signals proportional to the sensed changes in impedance;

addressing a lookup table with the generated signals, such lookup table having a plurality of entries each containing a thickness value for the ferromagnetic layer, and a standoff distance between the ferromagnetic layer and the probe;

reading the thickness value and standoff distance from the lookup table corresponding to the first and second signals; and displaying the thickness and standoff distance.

14. The method of claim 13, wherein the generating step comprises the steps of:

generating first and second analog values proportional to the sensed changes in impedance; and converting the first and second analog values to digital values.

15. A method of measuring a thickness of a ferromagnetic layer formed over a conductive base layer using an eddy current probe, wherein the probe is separated from an upper surface of the ferromagnetic layer, comprising the steps of:

positioning the eddy current probe near the ferromagnetic layer upper surface;

driving the eddy current probe with a low frequency alternating current;

moving the eddy current probe toward the ferromagnetic layer upper surface;

as the eddy current probe moves toward the ferromagnetic layer upper surface, sensing changes in impedance of the probe caused by the presence of the ferromagnetic and conductive base layers;

from the sensed changes in impedance, calculating both a thickness for the ferromagnetic layer and a standoff distance between the probe and the ferromagnetic layer upper surface, and providing signals proportional thereto;

providing the standoff distance signal to a control circuit for positioning the probe; and using the provided standoff distance signal, controlling the position of the eddy current probe to maintain a spacing between the probe and the ferromagnetic layer upper surface.

16. The method of claim 15, wherein the calculating step comprises the steps of:

generating first and second signals proportional to the sensed changes in impedance;

mapping the first and second signals to corresponding values representing the thickness of the ferromagnetic layer, and the standoff distance; and generating the signals proportional to the thickness of the ferromagnetic layer and the standoff value from the corresponding values.

17. The method of claim 16, wherein the mapping step comprises the steps of:

addressing a lookup table with the generated signals, such lookup table having a plurality of entries each containing a thickness value for the ferromagnetic layer, and a standoff distance between the ferromagnetic layer and the probe; and reading the thickness value and standoff distance from the lookup table corresponding to the first and second signals.

18. The method of claim 17, wherein the generating step comprises the steps of:

generating first and second analog values proportional to the sensed changes in impedance; and converting the first and second analog values to digital values.

19. The method of claim 16, wherein the first and second signals comprise X and Y coordinate values on a coordinate plane.

20. The method of claim 15, wherein the eddy current probe is driven with an alternating current having a frequency of approximately 5 kilohertz.

* * * * *